UNITED STATES PATENT OFFICE.

SADAKICHI SATOW, OF SENDAI, JAPAN.

INSULATING COMPOUND AND PROCESS OF MAKING THE SAME.

1,245,980.　　　Specification of Letters Patent.　　Patented Nov. 6, 1917.

No Drawing.　　Application filed December 30, 1916.　Serial No. 139,887.

*To all whom it may concern:*

Be it known that I, SADAKICHI SATOW, a subject of the Emperor of Japan, residing at Sendai, Japan, have made a certain new and useful Invention in Insulating Compounds and Processes of Making the Same, of which the following is a specification.

This invention relates to insulating compounds and process of making the same.

The object of the invention is to utilize vegetable proteids in the manufacture of compounds for use as insulating material and to produce therefrom insulation for electricity in the desired form for use wherever such insulation is required.

Other objects of the invention will appear more fully hereinafter.

In carrying out my invention I employ vegetable proteids or proteidal substances such as are obtained from suitable vegetable proteid containing material.

The proteids or proteidal substances employed in carrying out my invention are obtained in any suitable manner from any suitable raw material which contains vegetable proteids, such as beans, peas, wheat, corn or other leguminous, cereal or grain products.

The proteid containing raw material is crushed to break down the cellular structure thereof, and, if the material employed contains an undesirable percentage of oil, the oil content is removed. This may be effected in any suitable manner, as, for example, by treating the mass with an oil solvent such as benzin. The oil solvent is then removed from the mass.

The proteidal substances contained in the "meal" or "proteid meal," thus produced, are separated therefrom to produce a refined proteid product. This separation of the proteidal substances from the proteid meal may be effected in various ways. According to one method the "meal" is treated with an alkaline solution, such as a dilute solution of caustic or carbonated alkali, or caustic or carbonated ammonia, and the proteidal substances, either with or without further purification of the resulting liquid, are precipitated therefrom. The further purification referred to may be accomplished by filtration, centrifuging or the like, by fractional precipitation, fractional solution of precipitated impure proteids, or by converting one or more components into other chemical compounds having different properties which enable their separation to be effected, or one or more of these various purifying methods may be employed in combination with the others. The precipitation of the refined proteidal substances is accomplished by adding a suitable acid such sulfuric, sulfurous, acetic or phosphoric, or by adding a suitable ferment such as lactic or acetic.

According to another method the "meal" is treated with water and the refined proteidal products are precipitated out of the resulting liquid, either with or without purification thereof, as above explained, the precipitation being effected with an acid or by a ferment as above described.

According to still another method the "meal" is treated with an aqueous salt solution, such as sodium chlorid, ammonium sulfate, or the like, and the resulting liquid, either with or without further purification, as explained, is subjected to dialysis.

The refined proteids or proteidal substances, obtained as above described, whether in the form of a dry powder, or of a moistened mass or cake, are subjected to the action of a suitable glutinizing agent. I have found that aromatic compounds which possess acid properties, such as carbolic acid, cresol or other phenol will well answer the purpose.

When vegetable proteids of the character which are soluble in a phenol, are mixed with such a glutinizing agent, by reason of the amphoteric property of the proteid, the phenol combines with the proteids which pass into solution, and forms a complex salt. When such combination takes place at the proper temperature sudden chemical changes occur in the mass and a liquid gluelike substance of transparent light brown color, and possessing great adhesiveness, will be obtained. Care should be taken to effect the combination at the proper temperature because if the temperature is not at the right degree the result is a substance which possesses very little adhesive property. Particularly is this true of glycinin. The chemical changes effected when the proper temeprature is observed are especially remarkable when the glycinin contains a suitable proportion of water.

The glutinized mass obtained as above described is then treated with a suitable condensing agent, such as an active methylene compound. I have found that formaldehyde well answers the purpose, although trioxymethylene, hexamethylenetetramin, and the like, may be employed. The condensing agent is mixed with the glutinized mass. A remarkable chemical change takes place the instant the condensing agent is added to the mass. The liquid adhesive glue-like substance is transformed into a jelly-like mass. After a few seconds, however, with the kneading, stirring or mixing operation continuing, the mass resumes its liquid form, and its adhesive property, which was reduced by the sudden chemical action referred to, is restored. Ordinarily when a phenol is combined with formaldehyde or other active methylene compound, in the presence of a catalyzer, such as ammonia, caustic soda, or sulfuric acid, water results by the chemical condensation of the phenol and formaldehyde. When, however, the phenol is first combined with proteids in accordance with my invention, and as above described, the character of the resulting mass is chemically changed and no condensation of phenol and formaldehyde molecules to form water takes place. Consequently, I entirely avoid the use of a catalyzer in producing the insulating compound of my invention, and not only do I eliminate the use of a catalyzer, but I also dispense with the necessity of employing high temperatures or high pressures in the production of my insulating compound. I have found that normal atmospheric pressure and room temperature are sufficient, thus enabling me to greatly reduce the cost of manufacture of an insulating composition and at the same time produce a very superior article for insulating purposes.

If a transparent colored insulating compound is desired any suitable anilin dye may be mixed with the mass, and if a non-transparent colored composition is desired, a suitable pigment is mixed with the mass.

The mass produced as above described is reduced to solid form by being evaporated to dryness in a vacuum apparatus or otherwise and the resulting solid substance is crushed into a fine powder which is then molded into the desired or required shape to form the insulation in a hot press at a temperature of 110° C. to 115° C. and at a pressure of 1000 to 2000 pounds. Or by molding the composition into sheet form of the desired dimensions, insulating strips, washers, sheets, boards or the like may be cut therefrom for use wherever such insulators may be required.

If desired, cotton or other fiber, fabric, hemp, flax, paper pulp, wood pulp, or the like may be formed in the usual or any desired manner into sheets or other form of the desired or required dimensions and immersed in the liquid substance obtained by treating the glutinized mass with a condensing agent, and the resulting article, impregnated with the insulating composition, used for insulating purposes. In this case, and in order to increase the insulating properties of the article, the air should be removed from the fibrous sheet or body before immersion in the liquid composition, thereby enabling the composition to thoroughly and efficiently impregnate the sheet or body. After impregnating the fibrous sheet or body with the liquid insulating compound, said sheet or body is dried.

Insulating material produced as above described is not affected by water, acids, alkalis or organic solvents, nor by heat or cold, nor changes in weather conditions, and forms a good insulator of electricity. It may be used in any desired form and in any situation where insulation is required.

Having now set forth the objects and nature of my invention and the process of carrying the same into practical use and operation, what I claim as new and useful, and of my own invention and desire to secure by Letters Patent is:—

1. In the manufacture of insulation the process which consists in glutinizing vegetable proteids, then condensing the glutinized mass and finally forming the resulting product into the required shape.

2. In the manufacture of insulation the process which consists in glutinizing vegetable proteids into a liquid adhesive glue-like mass, and then treating the glutinized mass with an active methylene compound and forming the resulting product into the required shape.

3. In the manufacture of insulation the process which consists in glutinizing vegetable proteids into a liquid adhesive glue-like mass, and then treating the glutinized mass with an active methylene compound, then evaporating the resulting mass and forming the resulting product into the required shape.

4. In the manufacture of insulation the process which consists in glutinizing vegetable proteids with a phenolic agent, then treating the glutinized mass with an active methylene compound, then mixing a suitable coloring matter with the resulting mass and forming the resulting product into the required shape.

5. In the manufacture of insulation the process which consists in glutinizing vegetable proteids with a phenolic agent, and treating such glutinized mass with a condensing agent and forming the resulting product in to the required shape.

6. In the manufacture of insulation the process which consists in glutinizing vegetable proteids with a phenol, and treating such glutinized mass with formaldehyde and forming the resulting product into the required shape.

7. In the manufacture of insulation the process which consists in glutinizing vegetable proteids with a phenolic agent and an active methylene compound, and finally forming the resulting product into the required shape.

8. In the manufacture of insulation the process which consists in glutinizing vegetable proteids with a phenol and then subjecting the mass to the action of an active methylene compound.

9. In the manufacture of insulation the process which consists in glutinizing vegetable proteids with cresol and treating the mass with a condensing agent and finally forming the mass into a solid body.

10. In the manufacture of insulation the process which consists in glutinizing vegetable proteids with cresol and treating the mass with a condensing agent, then evaporating the mass and molding the resulting mass into the desired shape.

11. In the manufacture of insulation the process which consists in glutinizing vegetable proteids with cresol and treating the mass with an active methylene compound, and finally forming the mass into a solid body.

12. In the manufacture of insulation the process which consists in glutinizing vegetable proteids with cresol and treating the mass with an active methylene compound, then forming the mass into a solid body, then crushing such body and finally molding the crushed mass.

13. In the manufacture of insulation the process which consists in glutinizing vegetable proteids with cresol and then treating the glutinized mass with formaldehyde.

14. In the manufacture of insulation the process which consists in converting vegetable proteids into a liquid adhesive glue-like mass, and then treating such mass with an active methylene compound, then impregnating a fibrous body with the resulting liquid and drying the same.

15. In the manufacture of insulation the process which consists in converting vegetable proteids into a liquid adhesive glue-like mass, and then treating such mass with an active methylene compound, then impregnating a body with the resulting liquid and drying the same.

16. As a new article of manufacture an insulating product consisting of a liquid adhesive glue-like mass of glutinized vegetable proteid and a condensing agent, and formed into the required shape for use.

17. As a new article of manufacture an insulating product consisting of a liquid adhesive glue-like mass of glutinized vegetable proteid, and an active methylene compound and formed into the required shape for use.

18. As a new article of manufacture an insulating product consisting of a liquid glue, like mass of glutinized vegetable proteid, a condensing agent and a fibrous body.

19. As a new article of manufacture an insulating product consisting of a liquid adhesive glue like mass of glutinized vegetable proteid, an active methylene compound and a fibrous body.

20. As a new article of manufacture an insulating product consisting of a liquid adhesive glue like mass of glutinized vegetable proteid, and formaldehyde and formed into the required shape.

21. As a new article of manufacture an insulating product consisting of a liquid adhesive glue like mass of glutinized vegetable proteid, formaldehyde and a fibrous body.

In testimony whereof I have hereunto set my hand on this 23rd day of December, A. D., 1916.

SADAKICHI SATOW.